Jan. 9, 1962     G. J. EASLEY     3,016,113
SAFETY BRAKES FOR HOIST LINES
Filed Dec. 5, 1956
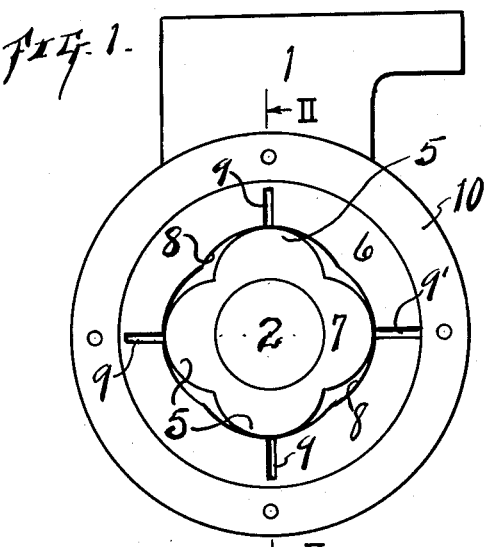
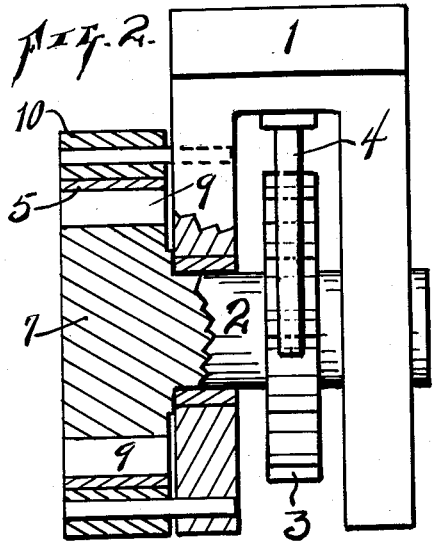
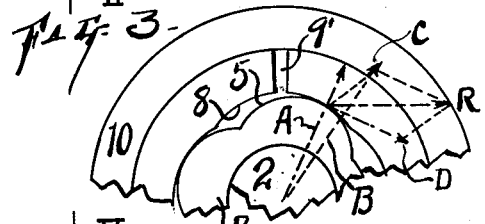
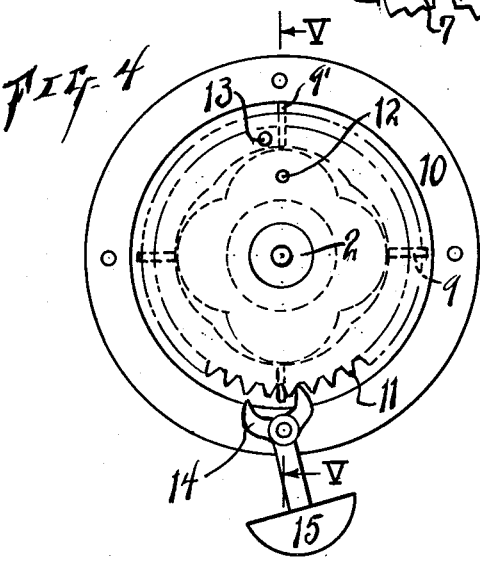
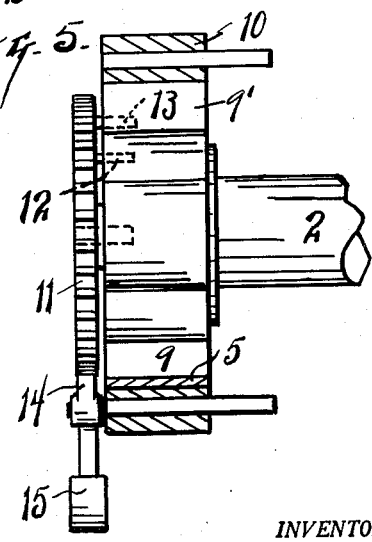
INVENTOR.
GERALD J. EASLEY.
BY *John E. Melton*
ATTORNEY.

3,016,113
SAFETY BRAKES FOR HOIST LINES
Gerald J. Easley, Fort Worth, Tex.
(4409 Mackey Drive, Richland Hills 18, Tex.)
Filed Dec. 5, 1956, Ser. No. 626,460
2 Claims. (Cl. 188—189)

My invention relates to safety brake mechanism and more particularly for a brake for hoisting devices which is adapted to function when the load line breaks; and An object of this invention is to provide a means for utilizing the load carried by a hoisting device in event of line breakage for overcoming the velocity of the fall of the load and stopping the same before its acceleration reaches such a magnitude as to cause further breakage of the hoisting line.

An advantage of my invention is that it is automatic in operation, relatively light in weight, and simple to make.

Other objects and advantages will be fully explained in the following description and more particularly pointed out in the accompanying claims.

Reference is had to the accompanying drawings which form a part of this application:

FIG. 1 is a face view of the device.

FIG. 2 is a sectional view taken at right angles to FIG. 1, showing a sprocket wheel for the load line and a means for holding said chain in operative relation with the wheel.

FIG. 3 is a diagrammatic view of the operation of the brake, showing the angles of force and leverage used for locking the chain in case of break of the chain or load line.

FIG. 4 is a view similar to FIG. 1, showing a variation in the structure thereof.

FIG. 5 is a partial section of FIG. 4, taken at right-angles thereto.

Similar characters of reference are used to indicate similar parts throughout the several views.

The device consists of a yoke-type of housing 1 which is adapted to rotatably support a shaft 2. An idler or sprocket wheel 3 is keyed to the shaft 2 and disposed between the two arms of the housing 1. A load line retainer member 4 is carried by the housing 1 and adapted to extend around a portion of the wheel 3. In this instance the member 4 cooperates with the arms of the housing 1 for guiding the load line in operative ride on the wheel 3. One end of the shaft 2 is formed as a cam 7. The cam 7 consists of a plurality of arc-shaped members 5 which are adapted to engage and expand a brake shoe 6. The brake shoe 6 consists of a ring or washer shaped member having its inner periphery curved to receive each of the arc shapes of the cam 7.

The shoe 6 is concentrically disposed about the rim of the cam 7 in operative relation with its brake ring 10. The inner peripheral curved portions 8 of the shoe 6 are of slightly greater diameter than the diameter of the arcs 5 of the cam 7. Each of the arcs 8 rests on its respective arc shape 5 of the cam 7, and in normal position they rest with their maximum point of radiation from the shaft, in alignment with each other. In this position they are not in opposition to each other in respect to rotation. The diagrammatic view (FIG. 3) illustrates the change of relation of the cam members 5 and 8 when a break occurs in the hoisting line. The arrows in this view, show the angles used in operation of the brake forces for expanding the shoe 6 against its ring 10 so as to lock the shaft 2 and its cam 7 against rotation before the shoe can rotate beyond a slight degree. In FIG. 3, the shaft 2 and its load has rotated a slight degree, changing the relations of the arcs 5 and 8 so that arcs 5 wedge against arcs 8 and expands the shoe 6 into frictional engagement with the drum 10 in such a manner as to minimize any tendency to gall or chafe the outer periphery of the shoe 6 in its frictional engagement with the drum 10.

The arrow D may represent the acceleration force of cam 7. Arrow R represents the frictional resistance between the shoe 6 and drum 10. Arrow C indicates the direction of force against the shoe 6 causing it to expand against the brake drum 10. Arrow A may indicate the first contact of 6 with 10 whereas arrow B might indicate an exaggerated degree of further rotation of cam 7 relative to the shoe 6.

Each of the arc-shaped forms 8 in the shoe 6 are provided with slits 9 which extend from the apex of each arc in a radial angle from the shaft and terminating at a slight distance from the outer periphery of the shoe 6. One of these slits 9' extend through the outer periphery of the shoe 6. These slits serve to permit expansion of the shoe 6. The shoe arcs 8 and arcs 5 form a radii interference due to their eccentric relation to each other. A break of the load line rotates cam 7 causing its arcs 5 to engage the arcs 8 in such a manner as to accelerate and multiply the brake force, thus wedging the shoe 6 against drum 10 and locking the load shaft against further movement. It has been found that this lock against rotation of the shaft may be accomplished before the shaft can rotate more than fifteen degrees. It will be noted that this locking effect may be attained when the shaft 2 is rotated in either direction.

The variation shown in the structure (FIG. 4 and 5) provides additional means for assuring the expansion of the shoe 6 under desired conditions. In this instance, a rachet wheel 11 is secured to the shaft 2 in a rotative manner and disposed adjacent the face of the cam 7. This wheel 11 is pinned to the cam 7 by means of a shear pin 12. A relatively heavier shear pin 13 is used for pinning the wheel also to the shoe 6. The sprocket wheel 11 is adapted to cooperate with an escapement and pendulum arrangement which may serve to limit the rate of speed of rotation of the shaft 2. A pawl or escapement member 14 is operatively disposed on the drum 10 adjacent the teeth of the wheel 11 and adapted as to serve as an escapement for the wheel 11. An integral arm or shaft is carried by the member 14 and the free end thereof is provided with a pendulum mass 15. The mass of the pendulum and length of its arm may be arranged so that normal operation of the brake mechanism permits the shaft 2 and its cam, the brake shoe 6 and the rachet wheel 11 to rotate in unison as the escapement member 14 controls the speed of rotation of the wheel 11.

When the load line breaks, the force of fall of the load will accelerate the swing of the pendulum above normal causing a force which will shear the pin 12 causing the cam 7 to expand the shoe 6 as above-stated. Further increase in frictional drag will result in shearing the larger pin 13 and a complete stop of the falling load.

It is obvious that many changes may be made in the structure and arrangement of the parts of the device shown without departing from the spirit of my invention. The object of the device is to provide a simple and inexpensive structure which is adapted to be actuated by the force of the falling load. A mass impact sensitivity of such a high degree that the load is stopped before it can descend more than a relative small distance. It has been found that by using graduated tonnage drop tests, that the stop of the fall is so instantaneous that no further line breakage has occurred.

What I claim, is:

1. In a hoist, a housing, a shaft rotatably mounted in said housing, a sheave fixedly carried by said shaft, a brake drum secured to said housing, a brake shoe of relatively large mass within said brake drum, cam means carried by said shaft and engaging the internal periphery of said brake shoe whereby a sudden change in the velocity of said shaft will cause relative movement between said shoe and cam means and move said shoe into frictional engagement with said drum and cam means to stop rotation of said shaft.

2. The combination with a shaft and supporting means therefor, of braking means comprising a rotatable cam carried by said shaft, a ring-like brake shoe surrounding said cam and expandable in response to relative rotation between said cam and shoe, a brake drum carried by said supporting means and surrounding said shoe, and releasable means for holding said cam and shoe against relative rotation, said releasable means being responsive to a rapid change in velocity of the shaft to disengage the brake shoe and cam and permit relative rotation therebetween to expand the shoe against the drum and stop rotation of the shaft.

References Cited in the file of this patent

UNITED STATES PATENTS

| | | |
|---|---|---|
| 182,061 | Cochran | Sept. 12, 1876 |
| 354,399 | Desdouits | Dec. 14, 1886 |
| 500,876 | Fitts | July 4, 1893 |
| 685,937 | O'Neill et al. | Nov. 5, 1901 |
| 924,695 | Sheeley | June 15, 1909 |
| 1,828,602 | Grosso | Oct. 20, 1931 |

FOREIGN PATENTS

| | | |
|---|---|---|
| 828,800 | France | Feb. 28, 1938 |
| 665,038 | Great Britain | Jan. 16, 1952 |
| 298,232 | Switzerland | July 1, 1954 |